United States Patent [19]

Knör et al.

[11] 4,251,157

[45] Feb. 17, 1981

[54] APPARATUS FOR SELECTING ORIGINALS FOR COPYING

[75] Inventors: Bernhard Knör; Bernd Payrhammer, both of Munich; Helmut Wahl, Unterhaching, all of Fed. Rep. of Germany

[73] Assignee: AGFA-Gevaert, A.G., Leverkusen, Fed. Rep. of Germany

[21] Appl. No.: 57,380

[22] Filed: Jul. 13, 1979

[30] Foreign Application Priority Data

Jul. 20, 1978 [DE] Fed. Rep. of Germany ....... 2831836

[51] Int. Cl.³ .............................................. G03B 27/52
[52] U.S. Cl. ..................................... 355/68; 250/559; 250/571; 356/444
[58] Field of Search ................................... 355/35–38, 355/67–71, 41, 133; 356/404, 443, 444; 250/559, 571

[56] References Cited

U.S. PATENT DOCUMENTS

| | | | |
|---|---|---|---|
| 3,690,765 | 9/1972 | Richard et al. | 355/68 X |
| 3,734,611 | 5/1973 | Knapp et al. | 355/68 X |
| 3,981,579 | 9/1976 | Weinert et al. | 355/41 X |
| 3,984,184 | 10/1976 | Pflugbeil | 355/41 X |
| 4,099,064 | 7/1978 | Grossman | 355/68 X |

Primary Examiner—Joseph W. Hartary
Assistant Examiner—W. J. Brady
Attorney, Agent, or Firm—Michael J. Striker

[57] ABSTRACT

A strip of negatives is transported over a slit extending transverse to transport, and the image of successive slit-like elements of each original is projected onto the row of photosensitive zones of a CCD image sensor unit. A photodetector also receives the image of each slit-like element, either simultaneously with the CCD image sensor unit or earlier at a more upstream location, and generates an output signal indicating the average transparency of the whole slit-like image element. The average-transparency signal is used to control the clocking frequency of the clock signal which drives the CCD image sensor unit, either by changing the clocking frequency for each read-out of the image sensor unit or by changing the clocking frequency once per original, in the latter case a peak detector circuit being used to ascertain the transparency of the maximum transparency slit-like element of each original. The CCD image sensor unit may be of the type whose clock signal identically establishes the read-out rate of the photosensitive zones of the CCD and the charge-accumulation interval thereof, or may be of the type whose clock signal establishes the charge-accumulation interval without establishing the read-out rate.

11 Claims, 4 Drawing Figures

APPARATUS FOR SELECTING ORIGINALS FOR COPYING

BACKGROUND OF THE INVENTION

The present invention concerns methods and arrangements for evaluating originals to be copied, e.g., photographic negatives to be printed, with respect to copiability, and most especially with respect to image sharpness. In systems of the type in question, photoelectric means are employed to sense light transmitted through or reflected from an original, or to sense a focussed image of part or all of the original projected onto the photoelectric means.

In present-day photographic processing installations, use is made of systems which not only automatically or semiautomatically evaluate originals with respect to density and color and then implement exposure or printing corrections, but also systems which evaluate originals, e.g., negatives to be printed, with respect to image sharpness, for example so that negatives which were exposed at totally wrong distance settings or with the camera obviously in motion during the course of a still exposure can be skipped during printing.

For example, commonly owned U.S. Pat. No. 3,981,579, granted Sept. 21, 1976, to Weinert et al, discloses a system which evaluates the rate of change of density across the surface of an original in order to be able to ascertain the presence of closely adjoining extremely small regions of the original having respective densities differing from each other by more than a predetermined value. In that patent, the presence of such immediately adjoining density-difference values are presumed to evidence light-dark image transitions attributable to a sharply focussed image. The presence of immediately adjoining extreme density differences is ascertained by effecting relative motion between the original and a photodetector, to yield a scanning signal, forming the time derivative of the scanning signal, and ascertaining when the absolute magnitude of the time derivative exceeds a predetermined value, or in other ways likewise disclosed in that patent. The number of sufficiently extreme immediately adjacent density differences is then summed, and printing of the scanned negative is permitted or not depending upon whether the summed number does or does not exceed a predetermined number.

Image-sharpness evaluating systems of that type evaluate image sharpness with a degree of accuracy dependent upon how small a surface-area element of the original can be instantaneously scanned. Accordingly, consideration has been given to the use, instead of the photodetector elements of that patent, of vidicon scanning systems, inasmuch as these can provide a scanning spot of small surface area. However, such vidicon scanning systems tend to be limited to use where the original to be evaluated (which is typically one original in a long strip of transported originals) is at complete standstill during the scanning operation, or at least can be transported at relatively low speed during the scanning operation. Furthermore, vidicon scanning systems, and the like, tend to be complex and costly.

SUMMARY OF THE INVENTION

It is a general object of the invention to provide a copiability-evaluating system of the general type referred to above, or similar thereto, in which very small constituent surface-area elements of the original can be photoelectrically sensed, using simple and unproblematic means, such as to provide a high level of photoelectric sensitivity even when the originals, for example due to over- or underexposure, present to the photoelectric means of the system extremes of density or transparency such as would tend to counteract the possibility of extreme sensitivity.

In the presently preferred embodiment of the present invention, use is made of a CCD (charge-coupled device) sensor operative for sensing a predetermined portion of the original to be evaluated, with the clock frequency used to operate the CCD sensor, i.e., to control its interval of charge accumulation, being automatically varied in dependence upon the measurement of characteristics involving the detection of a larger than point-sized area of the original, e.g., in dependence upon the average or overall density of the original or of a predetermined major or central part of the original, or, e.g., in dependence upon the density value of an extreme-density point of the original.

Thus, in accordance with the present invention, the property of such a CCD sensor to accumulate charge as a function of both exposure illumination and exposure time is positively utilized, in order to continually vary and match the operative range of the CCD sensor to the density or transparency situation being encountered, so that a high degree of sensitivity be maintained in the operation of the CCD sensor despite the considerable variations in the density characteristics of originals to be evaluated. For example, in the case of an evaluation of image sharpness on the basis of measured density differences as between immediately adjoining surface-area elements of the original, the best presumptive indication of a highly focussed image is an extreme, abrupt dark-to-light transition, it being the magnitude of the density difference, not the magnitude of the two densities considered individually, which is informative in this respect. It may happen that one of the two densities is at the lower limit of the operative range of the CCD sensor and the other density at the upper limit of its operative range, and in so extreme a situation this extreme difference can generally be evaluated or detected, by signal-processing circuitry connected to the output of the CCD sensor, even if the two signals produced by the CCD sensor are, neither of them, accurately proportional to the actual densities of the two surface-area elements involved, i.e. because the CCD sensor has been constrained, in such a situation, to operate at or outside its accurate operative range for both values involved. However, depending upon the image content and degree of exposure involved, the situation may be much less extreme and require the CCD sensor to produce individual density signals both of which are accurate. It may be, for example, that a negative whose image sharpness is perfect has density values which are all predominantly on the low side, or all predominantly on the high side, with the result that the most extreme light-to-dark transition present on this perfectly focussed negative is represented by the difference between an extreme density value at or outside the accurate operating range of the CCD sensor and another density value close to the same limit of the CCD sensor's operative range. In that event, the ability of the system to accurately enough determine the density difference involved may be lost, the failure of one of the two density signals to be accurate destroying the accuracy and significance of the difference signal produced.

In accordance with the presently preferred embodiment of the present invention, means is provided whereby to continually and automatically adjust the effective operative range of the CCD sensor, such as to maximize the probability that the two density values involved in each such adjoining-density difference or comparison both fall within the accurate operative range of the CCD sensor, so that accurate density-difference information can be generated, or more precisely stated so that the system respond, to a maximized extent, to the abrupt light-to-dark transitions present on an original irrespective of the fact that the majority of these may involve density values near the extremes of the CCD sensor's accurate operative range.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
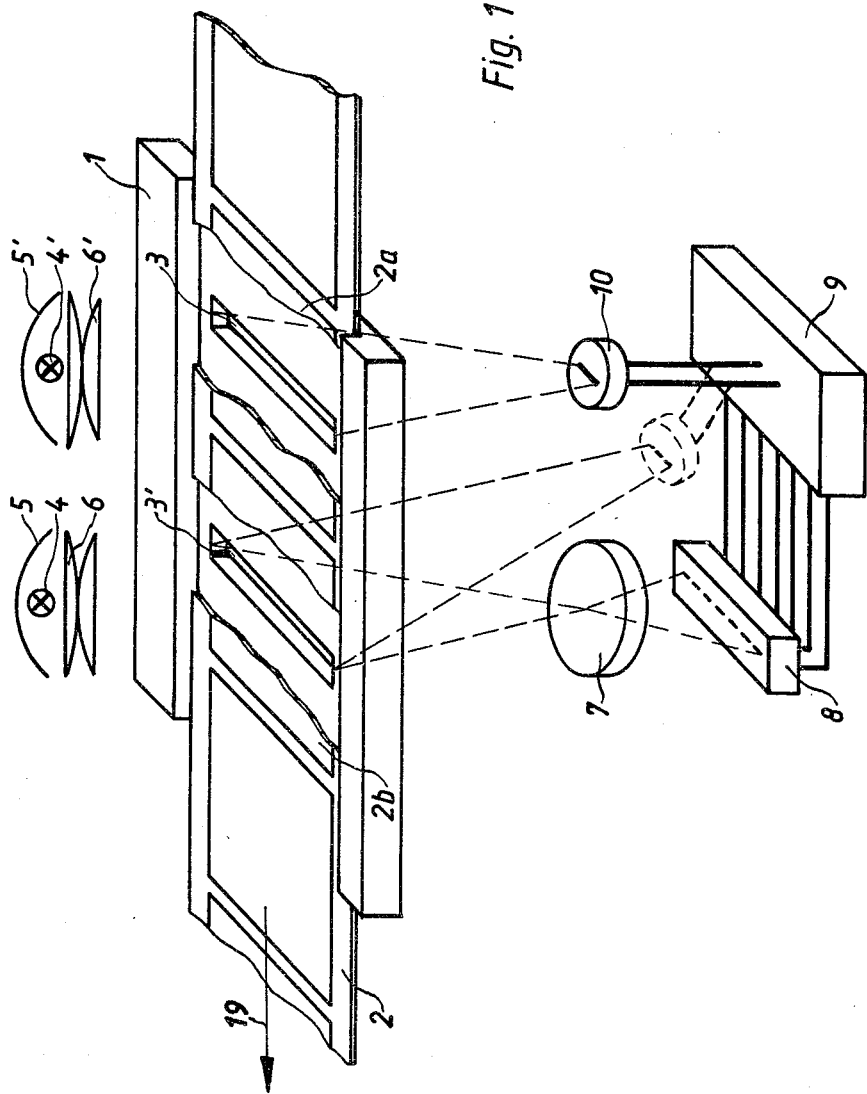
FIG. 1 is a schematic perspective illustration of the mechanical configuration of an exemplary embodiment of the present invention.

FIG. 1 schematically depicts in perspective view the mechanical part of an exemplary copiability-evaluating system embodying the present invention. Numeral 1 denotes an evaluating-station light-blocking structure across which a strip 2 of originals to be copied is transported. The light-blocking structure 1 is provided with a narrow slit 3' which extends transverse to the transport direction of strip 2. Light is projected through slit 3' from a light-source unit comprised of a lamp 4, a reflector 5 and a lens system 6. A projection optics 7 located at the other side of the slit 3' projects an image of the slit 3' onto a CCD image sensor unit 8. CCD image sensor unit 8 is electrically connected to an electronic evaluating circuit unit 9, to which is also electrically connected a photodetector 10. The photosensitive surface of photodetector 10 receives light from a further such slit 3 located upstream of slit 3', as considered in the transport direction of strip 2, by a distance approximately equal to the transport-direction length of each original of the strip, e.g., of each negative of a strip of photographic negatives to be printed. The slit 3 is of the same configuration as the slit 3'. Another such light-source unit 4', 5', 6' projects light through the further slit 3. In the exemplary embodiment here illustrated, the entire image of slit 3 is cast onto the photosensitive surface of photodetector 10 without differentiation as to the constituent surface-area elements of the slit 3, and accordingly the photodetector 10 produces a single output signal whose instantaneous value corresponds to the total or average intensity of light instantaneously transmitted through the entirey of slit 3; however, this is only exemplary.

Although in the illustrated embodiment the light incident upon CCD image sensor 8 and photodetector 10 is light transmitted through transparent originals, it will be understood that, alternatively, the light incident on these elements could be reflected light reflected off the surface of non-transparent originals.

Figure 2:
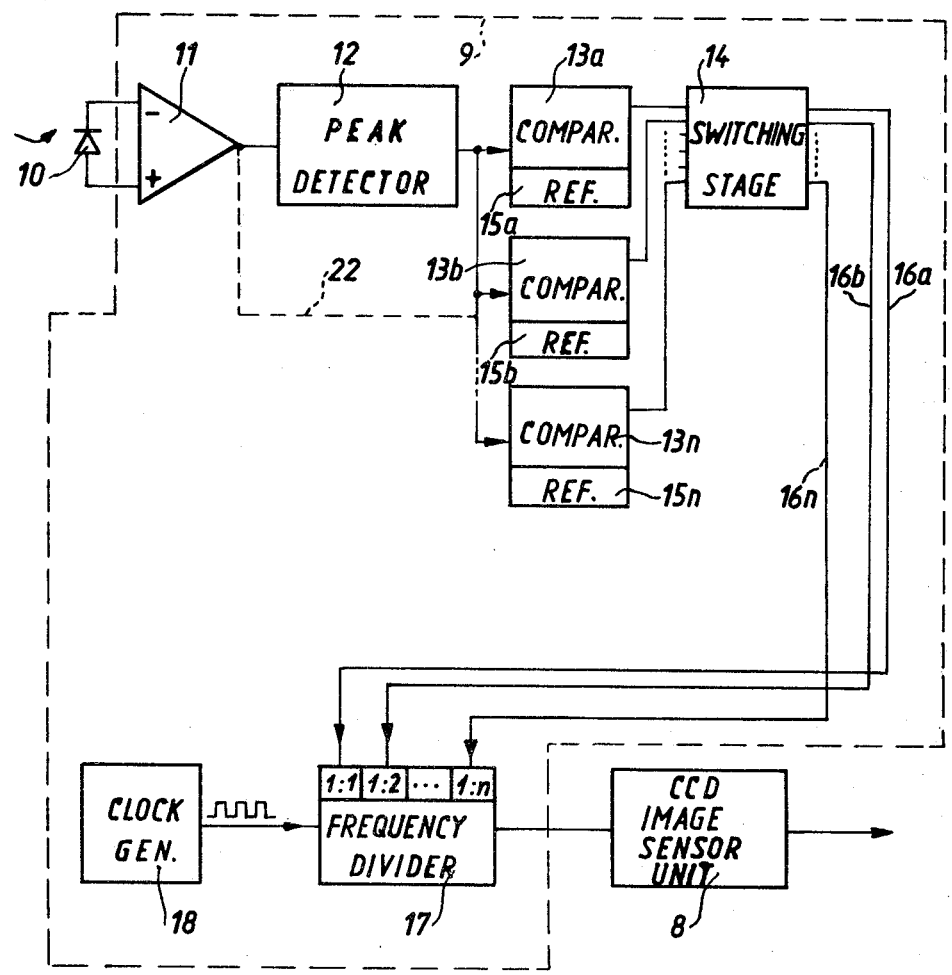
FIG. 2 depicts the relevant parts of the circuitry used in the exemplary embodiment.

FIG. 2 schematically depicts the configuration of an exemplary embodiment for the evaluating circuit unit 9 of FIG. 1. Photodetector 10 is connected across the input of an amplifier 11, to whose output is connected the input of a peak detector 12 comprised of a sample-and-hold stage. In the preferred embodiment illustrated, but by way of example only, the photodetector 10 and peak detector 12 are employed to generate, per original to be evaluated, a signal indicating the density of the maximum-transparency constituent scanned strip of the original. Thus, during transport of originals 2a, 2b, etc., across the light-blocking structure 1, the photodetector 10 produces an output signal whose instantaneous value indicates the total or average transparency of the constituent strip-like portion of the original (2a in FIG. 1) located above it. During transport of this original 2a across slit 3, the successive values assumed by the photodetector signal are applied to the peak detector 12, so that by the time the entire original 2a has crossed slit 3 the signal registered by peak detector 12 will indicate the transparency of the maximum-transparency scanned transverse strip of original 2a. By this time, the original 2a will just be beginning to cross slit 3', and the maximum-transparency signal just developed is transmitted to the internal sample-and-hold stage of peak detector 12, so as to be available at the output of peak detector 12 during the crossing of slit 3' by original 2a. At the same time, the peak-detector circuitry within peak detector stage 12 is reset, in order to be able to next determine the maximum transparency value for the next-arriving original. In FIG. 1, with original 2b in the process of crossing slit 3', the signal available at the output of peak detector 12 is the maximum-transparency signal pertaining to an original. As original 2b crosses slit 3', peak detector 12 is meanwhile developing the maximum-transparency signal for the next original 2a, although this signal is not yet transmitted to the output of peak detector 12.

The maximum-transparency signal produced at the output of peak detector 12 is applied in common to a plurality of comparators 13a, 13b, ..., 13n. The outputs of these comparators are connected to inputs of a switching stage 14. Each comparator 13a–13n is provided with a respective reference-signal stage 15a, 15b, ..., 15n, which is adjustable for selecting the voltage level which the comparator's input signal must reach for the comparator to produce an output signal. Switching stage 14 has a plurality of output lines 16a, 16b, ..., 16n connected to respective ones of the division-factor control inputs of a frequency divider stage 17. Frequency divider stage 17 receives a clock pulse train from a clock generator 18 and transmits an output pulse train whose pulse repetition frequency has been reduced by whatever factor corresponds to the activated one of its set of division-factor control inputs 16a–16n. The output pulse train of frequency divider stage 17 is applied to the control input of CCD sensor 8, to control the serial-read-out rate thereof and/or to control the charge-accumulation interval of the CCD sensor.

Figure 4:
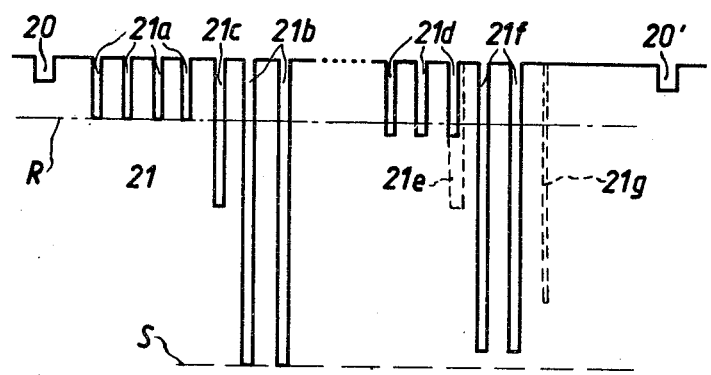
FIG. 4 graphically depicts the serial pulse train produced at the output of the CCD sensor.

The CCD sensor 8 has, in the exemplary embodiment illustrated, a total length of about 20 mm and comprises a row of ca. 1,700 adjoining photosensitive zones, each photosensitive zone having an area of about 8 microns by 17 microns. The time interval during which the constituent photosensitive zones of the CCD sensor are permitted to accumulate charge is determined by the repetition frequency of the clock pulse train used to control the CCD sensor. The differing amounts of charge accumulated in association with each individual photosensitive zone depend upon the different densities of successive points of a transverse strip-shaped zone of the scanned original, and the CCD sensor is read out sequentially to yield a pulse train the amplitudes of whose successive pulses correspond to the density values of the successive image points of the strip-shaped zone of the original, as shown in FIG. 4 which representatively depicts the pulse train read out during each sequential read-out of the CCD-sensor unit. Each read-out cycle is initiated by a synchronization pulse 20 or 20'. The CCD elements charge in dependence upon both the intensity of light to which they are exposed and the interval during which they are permitted to accumulate charge, each density value being represented in a sense by the pulse content of each constituent pulse of the signal read out.

Figure 3A:
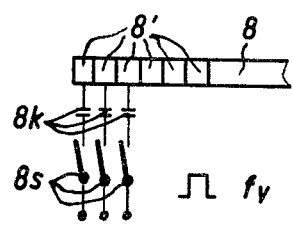
FIGS. 3a and 3b depict two equivalent circuits of a CCD sensor such as here contemplated, and are referred to in order to elucidate certain aspects of operation of such CCD sensors positively exploited in the embodiment here illustrated.
Figure 3B:
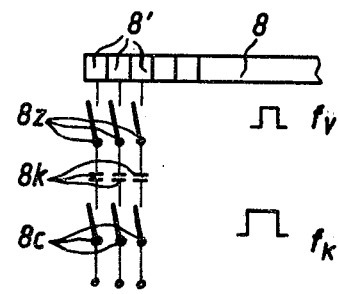

The CCD sensor 8 can be a part of an analog-shift-register configuration, and the manner in which light-dependent charge is accumulated depends, as will be understood by persons skilled in the art, upon the CCD configuration and construction employed. FIG. 3a depicts the equivalent circuit of one conventional CCD configuration, each constituent element of the CCD sensor being provided with associated capacitance 8k, and switches 8s being provided to read out the individual CCD-sensor elements. The transfer switches 8s are closed, in accordance with the present invention, at a variable frequency $f_v$, this being discussed further below. FIG. 3b depicts the equivalent circuit of another conventional CCD configuration, in which charge transfer switches 8z connect the CCD-image-sensor elements to respective capacitances 8k and therefore when conductive permit the accumulation of charge. These charge transfer switches 8z are, in accordance with the present invention, closed at a variable frequency $f_v$ discussed below. Read-out switches 8c are then closed to effect charge-transfer read-out of the thusly accumulated charges; the switches 8c do not determine the charge-accumulation interval allotted, and therefore can be closed at a constant frequency $f_k$. Such CCD image sensor units with direct or indirect information generation are well known and discussed, merely by way of example, in the German publication "Fernesehund Kinotechnik," March 1977, pp. 82–86.

An important aspect of the present invention will now be elucidated with respect to FIG. 4, in which a sequence of read out pulses 21 is depicted. The signal pulses 21a represent the signal pulses produced when the CCD image sensor unit is exposed to light transmitted through an original of absolute-black density value, at a medium value of the variable clocking frequency used to drive the CCD image sensor, i.e., irrespective of whether the configuration of FIG. 3a or of FIG. 3b is involved. Accordingly, the amplitudes of these signal pulses 21a constitute the noise limit R at a medium value of the variable clocking frequency $f_v$ in question. In contrast, signal pulses 21b represent the signal pulses produced when the CCD image sensor unit 8 is exposed through an original of extremely low density, again assuming that the variable clocking frequency $f_v$ employed is set to a medium value; the amplitude of these signal pulses 21b is at the saturation limit S of the CCD image sensor unit. In order that the signal pulses produced be accurately indicative of density value, even though the densities in question be extremely low or extremely high in this way, it is necessary that the amplitudes of the signal pulses produced be confined intermediate the operating-range limits R and S, e.g., such as shown for signal pulse 21c.

If a negative has been overexposed (although perhaps in perfect focus), very high density values will usually be involved, tending to yield signal pulses such as shown at 21d in the immediate vicinity of the noise limit R. According to the present invention, in order to bring this pulse amplitude more into the middle of the operating range of the CCD image sensor unit, the clocking frequency $f_v$ is lowered. In the case of the configuration of FIG. 3a, this results in a lengthened charge-accumulation interval, achieved by lowering the read-out rate. In the case of the configuration of FIG. 3b, the decreased clocking frequency $f_v$ increases the charge-accumulation interval, but the constant read-out frequency fk need not be changed.

Conversely, in the case of a perfectly focussed but underexposed negative, very low density values will usually be encountered, tending to yield signal pulses such as at 21f whose amplitudes are in the vicinity of the saturation limit S. In accordance with the present invention, when low density values are encountered, the variable clocking frequency $f_v$ is increased, so as to shorten the charge-accumulation interval with a corresponding decrease in the read-out rate employed (FIG. 3a) or without any increase in the read-out rate employed (FIG. 3b). This results in a charge pulse 21g of lesser breadth and lesser amplitude.

The variation in the read-out rate or charge-accumulation interval will be most clearly understood from FIG. 2. The average-density signal pertaining to the transverse strip-like element of the negative instantaneously located above slit 3 is amplified by amplifier 11 and applied to the input of peak detector 12. By the time this negative has crossed slit 3, the sample-and-hold circuit internal to peak detector 12 will have ascertained and now be holding a signal indicating the transparency value of the maximum-transparency strip-like element of the entire negative in question, so that this maximum-transparency signal be available as the negative in question crosses second slit 3', with its successive constituent strip-like elements being successively imaged onto CCD image sensor unit 8. This negative's maximum-transparency voltage is applied to the comparators 13a–13n, which operate at different respective reference voltage levels set by their respective reference voltage stages 15a–15n. Depending upon the level of the maximum-transparency voltage applied to the comparators 13a–13n, one or more of them will produce output signals, which are applied to corresponding inputs of switching stage 14. For example, if the maximum-transparency strip-like element is of medium transparency, and depending upon how reference voltage stages 15a–15n have been set, it may be only comparators 13a and 13b which produce output signals, in response to which switching stage 14 applies an activating signal to the 1:2 (divide by two) division-factor control input line 16b of controllable frequency divider stage 17. The constant-repetition-rate pulse train produced by clock generator 18 is then reduced to half that pulse repetition rate, and the CCD image sensor unit 8 is then clocked to produce signal pulses whose amplitudes are on the order of pulses 21c in FIG. 4. If a negative of very low density is involved, then it may be that only comparator 13a produces an output signal, in which case switching stage 14 applies an activating signal to the 1:1 division-factor control line 16a of frequency divider stage 17, in which case the clocking frequency used for the CCD image sensor 8 is undivided, although higher relative to the clocking frequency used for medium-density negatives.

In the case of a negative having an extremely high density value, it may be that all the comparators 13a–13n generate output signals in response to which switching stage applies an activating signal to the 1:n division-factor control line 16n of frequency divider stage 17. This establishes the highest available division factor 1:n and the lowest available clocking frequency, in order to obtain for example the signal pulses 21e of FIG. 4 which are broader and of greater amplitude.

Instead of controlling the variable clocking frequency $f_v$ on a whole-negative basis, e.g., in dependence upon the transparency value of the most transparent strip element of the whole negative, the clocking frequency could be varied in dependence upon the instantaneous average transparency value of the instantaneously imaged strip element, as indicated schematically for photodetector 10 in broken lines in FIG. 1. In that event, the photodetector would receive an image of the same strip element as imaged upon the CCD image sensor 8. Accordingly, in FIG. 2, it would be appropriate to eliminate the peak detector 12 with its internal sample-and-hold circuit, and instead connect the output of amplifier 11 directly to the inputs of the comparators 13a–13n, as indicated by the broken-line connection in FIG. 2.

It will be understood that each of the elements described above, or two or more together, may also find a useful application in other types of constructions and circuits differing from the types described above.

While the invention has been illustrated and described as embodied in the scanning of a strip of photographic negatives for generating information intended to be used to ascertain image sharpness, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for inspecting originals to be copied with respect to image sharpness, in combination, CCD image-sensing means comprising a multitude of photosensitive zones arranged in a row, means for positioning an original to be copied, means for illuminating the original and imaging the illuminated original onto the row of photosensitive zones of the CCD image-sensing means, and means for applying to the CCD image-sensing means a variable-frequency clock signal, including frequency-varying means operative for automatically determining the value of an optical characteristic of the original and in dependence thereon varying the frequency of the variable-frequency clock signal.

2. An arrangement as defined in claim 1, the means for positioning an original to be copied comprising guide means defining a transport path for transported originals, the illuminating and imaging means comprising means for projecting onto the row of photosensitive zones of the CCD image-sensing means an image of a strip-like element of the original extending transverse to the transport direction, the frequency-varying means comprising means for varying the frequency of the variable-frequency clock signal in dependence upon the average value of an optical characteristic of the entire strip-like element of the original projected onto the row of photosensitive zones of the CCD image-sensing means.

3. An arrangement as defined in claim 2, the means varying the frequency in dependence upon the average value of an optical characteristic of the entire strip-like element of the original comprising photodetector means operative for sensing the entire strip-like element at substantially the same instant as the strip-like element is projected onto the row of photosensitive zones of the CCD image-sensing means.

4. An arrangement as defined in claim 2, the means varying the frequency in dependence upon the average value of an optical characteristic of the entire strip-like element of the original comprising photodetector means operative for sensing the entire strip-like element with the latter in a position which is upstream as considered in the transport direction from the position in which the strip-like element of the original is located when projected onto the photosensitive-zone row of the CCD image-sensing means.

5. An arrangement as defined in claim 1, the CCD image-sensing means being of the type whose charge-accumulation interval and read-out rate are both determined by the variable-frequency clock signal.

6. An arrangement as defined in claim 1, the CCD image-sensing means being of the type whose charge-accumulation interval is but whose read-out rate is not determined by the variable-frequency clock signal.

7. An arrangement as defined in claim 1, the means applying the variable-frequency clock signal comprising a clock signal generator providing a constant-frequency clock signal and a variable-division-factor frequency divider receiving the constant-frequency clock signal and deriving therefrom the variable-frequency clock signal, the frequency-varying means including photodetector means operative for sensing the average value of an optical characteristic of the strip-like element of the original and means responding to the sensed average value of such optical characteristic by establishing the frequency-division factor of the variable-division-factor frequency divider.

8. An arrangement as defined in claim 3, the photodetector means producing an output signal, the frequency-varying means furthermore including a set of comparators each connected to receive the output signal of the photodetector means and each having a respective reference voltage level and operative for producing output signals dependent upon the value of the output signal produced by the photodetector means.

9. An arrangement as defined in claim 4, the photodetector means producing an output signal, the frequency-varying means furthermore including extreme-value-detecting means receiving the output signal from the photodetector means and deriving therefrom an extreme-value signal indicating the value of said optical characteristic for that strip-like element of the original having the most extreme value, and a set of comparators each connected to receive the extreme-value signal and each having a respective reference voltage level and operative for producing output signals dependent upon the extreme-value signal.

10. An arrangement as defined in claim 8, the means applying the variable-frequency clock signal comprising a clock signal generator providing a constant-frequency clock signal and a variable-division-factor frequency divider receiving the constant-frequency clock signal and deriving therefrom the variable-frequency clock signal, the frequency-varying means including photodetector means operative for sensing the average value of an optical characteristic of the strip-like element of the original and means responding to the sensed average value of such optical characteristic by establishing the frequency-division factor of the variable-division-factor frequency divider.

11. An arrangement as defined in claim 8, the means applying the variable clock signal furthermore including a switching stage having inputs connected to the comparators and having outputs each connected to the frequency divider and operative for applying to the latter signals establishing different respective frequency-division factors.

* * * * *